(12) United States Patent
Davidson et al.

(10) Patent No.: US 7,765,525 B1
(45) Date of Patent: Jul. 27, 2010

(54) OPERATIONS MANAGER INFRASTRUCTURE FOR DYNAMICALLY UPDATING SOFTWARE OPERATIONAL POLICY

(75) Inventors: Harold R. Davidson, American Fork, UT (US); Gerald B. Huff, Berkeley, CA (US)

(73) Assignee: Intuit Inc., Mountain View, CA (US)

( * ) Notice: Subject to any disclaimer, the term of this patent is extended or adjusted under 35 U.S.C. 154(b) by 1331 days.

(21) Appl. No.: 10/932,987

(22) Filed: Sep. 1, 2004

(51) Int. Cl.
*G06F 9/44* (2006.01)

(52) U.S. Cl. .............. 717/124; 717/125; 717/126; 717/127; 717/128; 717/130; 717/131; 717/110; 717/111; 717/168

(58) Field of Classification Search .............. None
See application file for complete search history.

(56) References Cited

U.S. PATENT DOCUMENTS

| | | | | |
|---|---|---|---|---|
| 6,629,138 | B1 * | 9/2003 | Lambert et al. ............. | 709/224 |
| 6,829,770 | B1 * | 12/2004 | Hinson et al. ............... | 719/318 |
| 2003/0200533 | A1 * | 10/2003 | Roberts et al. ............. | 717/124 |
| 2004/0054695 | A1 * | 3/2004 | Hind et al. .................. | 707/200 |
| 2004/0093581 | A1 * | 5/2004 | Nielsen et al. ............. | 717/101 |
| 2005/0038779 | A1 * | 2/2005 | Fernandez et al. ............ | 707/3 |
| 2005/0114848 | A1 * | 5/2005 | Choi et al. .................. | 717/148 |
| 2005/0204344 | A1 * | 9/2005 | Shinomi ..................... | 717/124 |
| 2005/0210441 | A1 * | 9/2005 | Tarr et al. .................. | 717/101 |
| 2005/0216885 | A1 * | 9/2005 | Ireland ....................... | 717/108 |
| 2005/0262193 | A1 * | 11/2005 | Mamou et al. .............. | 709/203 |
| 2007/0180424 | A1 * | 8/2007 | Kazakov et al. ............. | 717/104 |

OTHER PUBLICATIONS

AspectJ™: the Language and Development Tools, Mik Kersten, Palo Alto Research Center, [online] Copyright 1998-2002, Retrieved from the Internet <URL: http://www.parc.com/research/csl/projects/aspectj/downloads/OOPSLA2002-demo, pp. 1-42.
I want my AOP!, Part 1, JavaWorld, [online] Copyright 2004, Retrieved from the Internet <URL: http://www.javaworld.com/javaworld/jw-01-2002/jw-0118-aspect.html.
Aspect-Oriented Programming, [online] [retrieved on Jan. 18, 2005] Copyright 2000-2004, Retrieved from the Internet <URL: http://www.iturls.com/English/TechHotspot/TH_e.aspm, pp. 1-6.

* cited by examiner

*Primary Examiner*—Insun Kang
(74) *Attorney, Agent, or Firm*—Park, Vaughan & Fleming LLP

(57) ABSTRACT

An Operations Manager subsystem decouples the generation of operational events from an associated behavior triggered by those events. The Operations Manager subsystem allows changing the associated behavior without requiring rebuilds or recompilations of the source code. In addition, changes to policies are possible even at runtime in order to enable more agile debugging and better application supportability. The Operations Manger subsystem includes separate reporting and subscription services. The reporting services provide an API defining operational code for the generation of operational events. The subscription services include a file system and an API that support multiple user subscriptions to the various code operational events defining the behavior associated with those events.

20 Claims, 5 Drawing Sheets

OPERATIONS MANAGER INFRASTRUCTURE FOR DYNAMICALLY UPDATING SOFTWARE OPERATIONAL POLICY

BACKGROUND OF THE INVENTION

1. Field of the Invention

The present invention is related to programming techniques for operational policies in software applications, and more particularly to improved operational policy management infrastructure and related applications for dynamically updatable operational policies.

2. Description of the Background Art

The software development process typically involves various levels of debugging. The code in a software application is analyzed to find and eliminate programming errors or "bugs." The debugging process takes place during the development process and typically continues throughout the life of the program through customer support. Initially, developers debug their assigned code modules until an executable version of the program is ready for testing. Then, alpha and beta builds are debugged based on interactions with a select few users. Ultimately, some level of debugging is generally involved with the various released builds of the software application, typically in the form of technical support teams dealing directly with customer problems. Often, this interaction leads up to updates and upgrades of the application itself.

To facilitate this complex debugging process during all the stages of the program, developers include special event-generating code in the application software that is not related to the business purpose of the program, i.e., the business logic or client code. The event generating code is related to the internal operation of the program and its main purpose is to provide information to that effect. This operational code helps the programmer identify sources of errors or warnings that may arise when the code is executed and to log important activities that can be useful in problem solving. Operational code is also used for testing and other purposes related to the maintenance of the code. For example, quality assurance processes involve regression testing as part of the software verification process. Such verification and testing functions also benefit from operational activities or events. Typically, operational code defines operational activities or events, e.g., logging, assertions, verifications, traces, and the like, and corresponding operational policy dictating a behavior for the program associated with the generated information, e.g., writing to output log files, breaking the debugger if in debug mode, beeping, displaying pop-up windows, and the like. In general terms, the operational policy is what defines a behavior associated with the information generated by the coded operational action or event.

Conventionally, the operational policy for each operational action is hard coded with the event-generating operational code. However, the operational policies often change throughout the development process. Initially, at early stages, developers embed in the code multiple operational events with detailed output policy to provide extensive information about the state of the system for debugging purposes. As errors are corrected and the code is revised, some of the operational behaviors are changed to reduce the level of detail reported, the intrusiveness of the output, and the overall performance of the code. In some cases, the operational code is removed if it is deemed no longer necessary. These operational policy changes are typically most significant between code builds: alpha builds, beta builds, and ultimately the release builds. However, it is difficult and time consuming to find all operational code and change it consistently when policies change.

A conventional approach to simplify the management of operational policies as requirements change between development stages and/or builds is to use the C/C++ notion of a macro. A developer places aliases for actual policy code in the source code, and then uses a preprocessor to replace the alias at compile time with the current policy code. This approach does not require the editing of multiple files but it does require recompiling after every change. With the same effect but with the additional requirement of editing every file when the policies change, another approach is to use source code editing scripts or macros. As new requirements arise or existing requirements change, the hard coded operational policies are automatically edited using pre-defined rules in scripts or macros, e.g., a find/replace-type script. Similarly, instead of editing every instance of operational code, a script can be used to edit in the source code certain parameter or variable values that are use in conditional statements in the code as part of the various operational events. For example, every operational event associated with a particular debugging purpose can include a condition for their execution that a certain variable be true. This way, in effect, the script can turn on or off the operational code for a particular debugging purpose by editing the variable value in the source code between true and false.

However, these conventional approaches to operational policy management based on editing scripts and macros require changes to the source code itself and/or subsequently the compiling of the new source code after the changes in order for the new operational policy to take effect. These approaches can be time consuming and inefficient when the source code is complex and requires lengthy compile times. Further, since they require editing and/or compiling the source code, these approaches cannot support dynamic updates to the operational policy, for example during runtime. Further, the code editing process itself can potentially become an additional source of errors, for example, by changing the wrong code. Another problem with conventional approaches is that people with different roles in the software development process (e.g. developers, QA, support, or the like), having differing needs policy-wise, either have to settle on policies that awkwardly try to meet the needs of many roles, or each role needs to compile a different version of the code with different policies defined.

Accordingly, what is needed is an operational policy management infrastructure that supports the ability to dynamically change the operational policies without having to change or recompile the client source code. What is further needed is an operational policy management infrastructure that decouples the operational policies from the source code authorship and compilation processes.

SUMMARY OF THE INVENTION

A typical software application system includes several concerns, i.e., particular goals, concepts, or areas of interest. For example, a software business application includes business logic concerns (e.g., accounting rules, inventory, purchase transactions, and the like), system-level concerns (e.g., security, data integrity, logging, or the like), and possibly many other concerns. Some concerns are very specific and can be implemented in a single software module. However, other concerns are application-wide; code regarding these "crosscutting" concerns is included in multiple functional modules within an application system.

An approach adopted in one embodiment described herein decouples operational policy management concern from the general business rules code in the software application. This approach solves the deficiencies in conventional approaches to operational policy management. The operational policy "concern" of a software application system is designed independently of other software modules. Operational policy aspects are defined to implement the operational policy for the entire application; the aspects provide tools to developers for the weaving of operational activities in the code. Further, changes to operation policy can be dynamically updated to maintain consistency throughout the application code.

In one embodiment, a computer-implemented method provides a dynamically updatable operational policy associated with operational events in the design of a computer application. The operational events are programmed in the code of the software application. According to this method, operational code is embedded in a client software application to produce at least one operational event without specifying a corresponding operational behavior. A subscription configuration file is provided that specifies at least one subscription to information associated with the operational event and an associated behavior. The software application monitors the subscription configuration file. The subscription configuration file is configured to cause the software application to trigger the operational behavior associated with the occurrence of the operational event. The operational behavior is triggered with respect to the input provided by the information generated by the operational event.

According to another embodiment, an operations manager system in a software development platform provides programming tools to handle operational policy concerns in software applications.

The operations manager subsystem includes a reporting service programming tool for programming operational events in the software applications. The reporting service programming tool includes a reporting API that includes definitions for a set of programming elements. The programming elements, when programmed into a software application and executed in a computer system, produce operational events.

The operations manager subsystem also includes a subscription service programming tool. The subscription service programming tool is intended for specifying operational behavioral policies associated with the operational events programmed in the software applications. The operational behavioral Policies are based on subscriptions to those operational events. For this purpose, the subscription service programming tool includes a subscription configuration file definition that comprises a set of tags for defining subscriptions. The subscriptions are configured to specify a behavior when parsed by an executing software application that includes the programmed operational events.

According to another embodiment, a method for debugging executable computer software programs is provided. The method includes creating a subscription configuration file that indicates a behavior associated with an operational event. The operational event is embedded in the executable computer software program. The subscription configuration file is transmitted over a computer network so it can be placed in a computer system directory. Data output according to the operational behavior indicated in the subscription configuration file is collected.

According to yet another embodiment, a computer-implemented system provides a dynamically updatable operational policy associated with operational events programmed in a software application. The system includes means for embedding operational code to produce at least one operational event in a client software application without specifying a corresponding operational behavior. The system also includes means for providing a subscription configuration file including a subscription to trigger a behavior associated with the operational event. The subscription configuration file is configured to be monitored by the software application during execution. It is also configured for causing the software application to trigger the behavior associated with the operational event as specified in the subscription configuration file.

In another embodiment, a computer-implemented method provides a dynamically updatable operational policy associated with a software application. The method includes providing an add-on interface in an operations manager system. The add-on interface is intended for registering custom tags, each associated with one or more operational subscription actions. These operational subscription actions are associated with computer programmed functions that when executed by a computer processor implement a custom operational behavior with respect to the software application.

A subscription configuration file is also provided. The subscription configuration file includes filter tags associated with one or more operational filters. The operational filters define one or more conditions with respect to the software application. Further, according to this method, a parsing function in the operations manager system is provided. The parsing function is configured to parse subscription configuration files. The parsing function is also configured to invoke the execution of the computer programmed functions. The computer programmed functions are associated with at least one operational subscription action. The execution is invoked in response to parsing at least one custom action tag associated with the operational subscription action and determining that the software application meets the one or more conditions specified in the associated one or more operational filters.

According to another embodiment, a computer-implemented method provides a dynamically updatable operational policy associated with a software application. The method includes providing an add-on interface in an operations manager system. In this embodiment, the add-on interface registers custom operational filter tags associated with operational filters. The operational filters are associated with conditions in the software application.

A subscription configuration file is also provided. The subscription configuration file includes action tags and at least one custom filter tag. From those action tags, at least one is associated with at least one of the custom operational filter tags. The action tags are also associated with computer program functions that when executed by a computer processor produce operational behaviors associated with the software application.

According to this embodiment, a parsing function is also provided in the operations manager system. The parsing function is configured to parse subscription configuration files. The parsing function is also configured to invoke the execution of at least one of the computer-programmed functions associated with the action tag. This execution is invoked in response to parsing the operational action tag associated with the custom operational filter tag and determining that the software application meets the conditions specified in the custom operational filters associated with the custom operational filter tags.

These features are not the only features of the invention. In view of the drawings, specification, and claims, many additional features and advantages will be apparent. The specification describes the invention for readability and instructional purposes. It does not limit the invention. A review of the claims is necessary to determine the invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

The following description of system components and operation is merely exemplary of embodiments of the present invention. One skilled in the art will recognize that the various designs, implementations, and techniques described herein may be used alone or in any combination, and that many modifications and equivalent arrangements can be used. Accordingly, the following description is presented for purposes of illustration, and is not intended to limit the invention to the precise forms disclosed.

System Architecture

Figure 1:
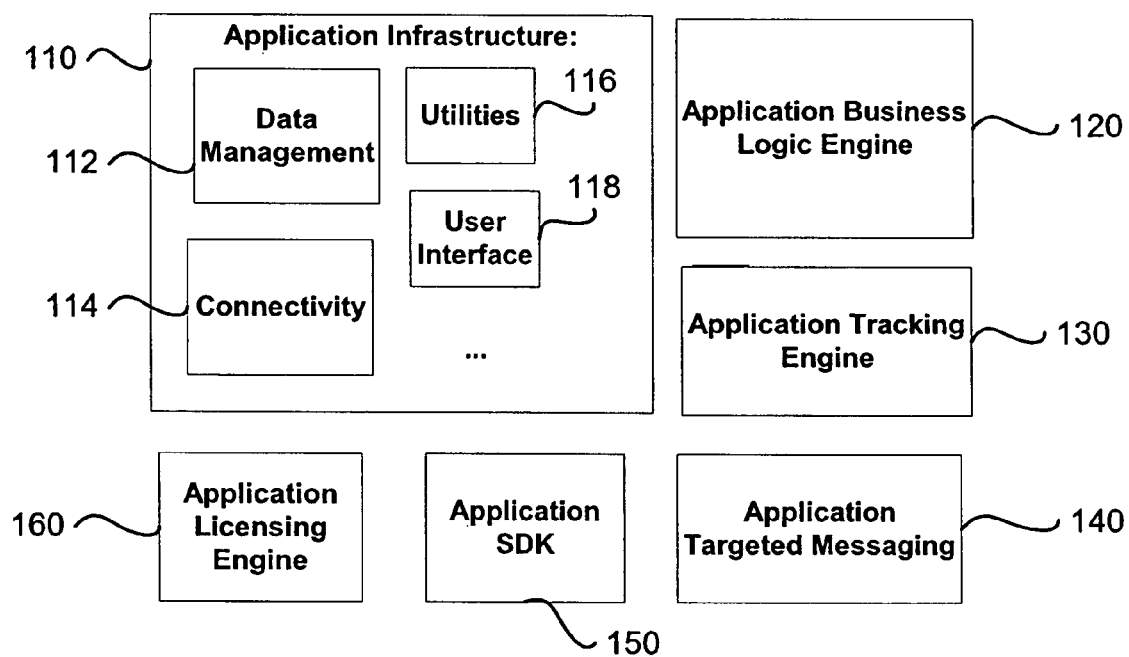
FIG. 1 is a block diagram of one embodiment of a software application system architecture for implementing the present invention.

Now referring to FIG. 1, a software application system architecture is shown. In a preferred embodiment, these functional block elements are implemented using one or more conventionally programmed general-purpose computers to function as described below. The architecture 100 includes several high level modules for implementing application concerns. Some of these modules include self-contained core concerns. For example, the application business logic engine 120 includes programs implementing the core functions of the system with respect to the ultimate purpose of the application. Other modules are application-wide features for the execution of the application. For example, the Application Infrastructure module 110 includes features required by several other modules of the application such as Data Management 112, Connectivity 114, Utilities 116, User interface 118, and possibly others. The Application Infrastructure 110 provides functional features that are used by the Business Logic Engine 120, the Licensing Engine 160, the Software Development Kit 150, and other system components. In a preferred embodiment, these components are implemented in a conventional, programmable, general-purpose computer system typically including one or more microprocessors, memory, data storage devices, and networking components to operate over a data network, either wired or wireless.

Figure 2A:
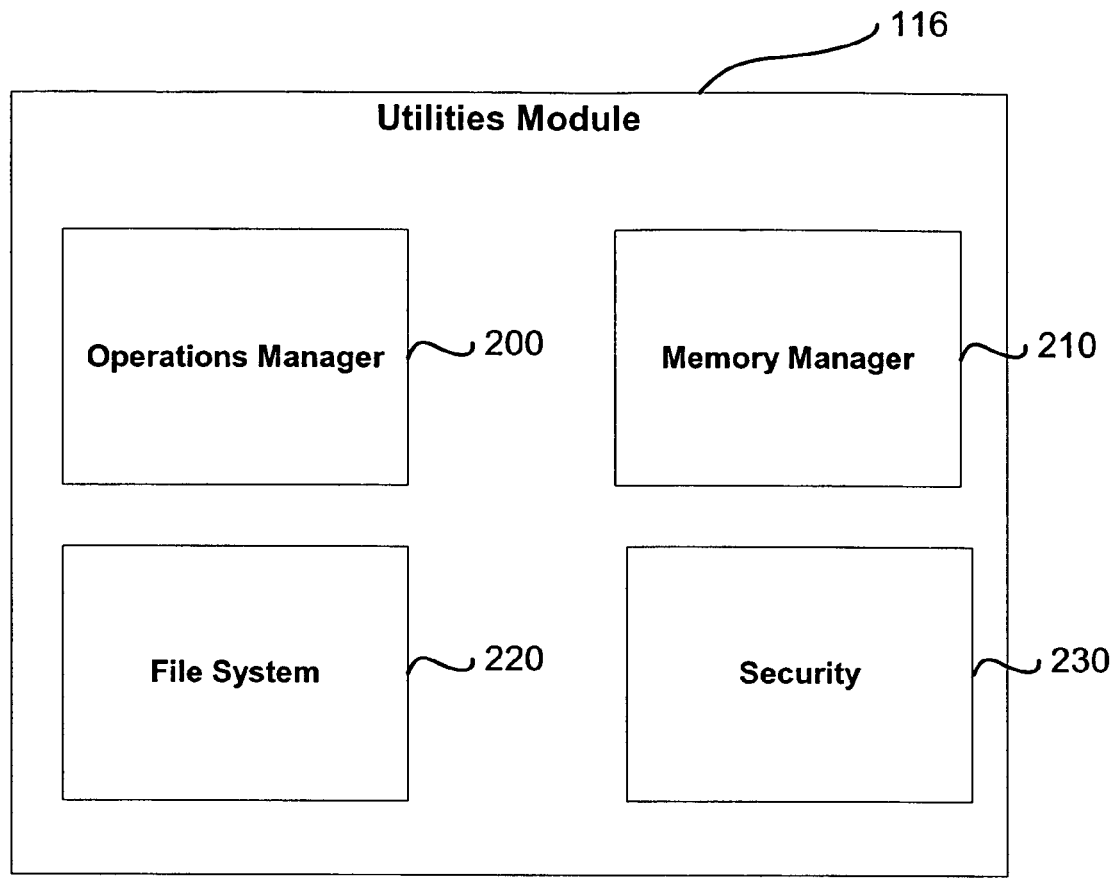
FIG. 2A is a block diagram of one embodiment of a Utilities Module in a software application system.

Now referring to FIG. 2A, a block diagram of the Utilities Module 116 is shown. The Utilities Module 116 includes several utility subsystems that are shared among all the modules in the application system. For example, in one embodiment, the Utilities Module 116 includes an Operations Manager 200 to handle operational policy concerns; a Memory Manager 210 to assist with memory access transactions with the operating system; and a File System 220 to interact with the underlying system file structure for accessing files in storage devices. Other function-specific utility subsystems can also be included in a Utilities Module 116.

Operations Manager

Figure 2B:
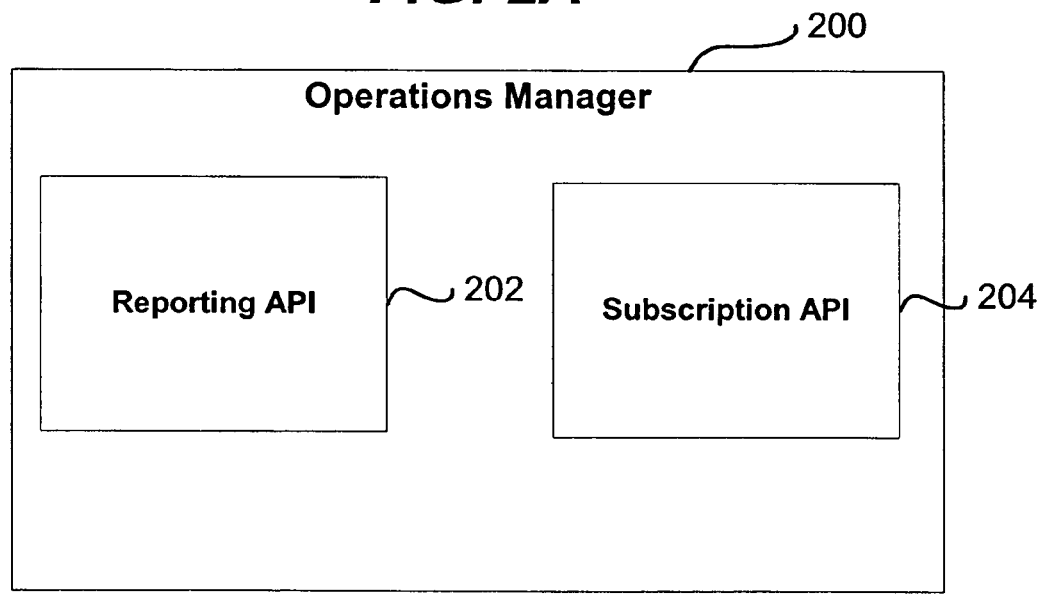
FIG. 2B is a block diagram of one embodiment of an Operations Manager Subsystem.

Now referring to FIG. 2B, a block diagram for one embodiment of an Operations Manager subsystem 200 is shown. The Operations Manager subsystem 200 ("Operations Manager") provides application-wide tools for handling different aspects of the operational policy concern. The Operations Manager subsystem 200 is designed for general usability in any component and in any layer of the software system architecture. In a preferred embodiment, the Operations Manager 200 is implemented across a network of conventional, programmable, general-purpose computer systems, including client and/or server systems, used in the development of software application systems. Some features of the Operations Manager 200 are also implemented, in conjunction with other software application components, in the conventional general-purpose or process specific computer systems of the ultimate users for which the software applications are intended.

The Operations Manager subsystem 200 includes two application programming interfaces ("APIs"). The APIs provide developers with an interface to reporting and subscription services offered by of the Operations Manager subsystem 200. A Reporting API 202 provides developers with operational code that can be used in programming any of the modules of the application. A Subscription API 204 provides a mechanism to handle and output information generated by the operational code but independently from the code itself. Accordingly, specification of output mechanisms is decoupled from the client code, thereby allowing policies to shift over time without affecting the client code. In this manner, the present invention facilitates policy changes, without requiring recompilation.

Reporting Services

The Reporting API 202 defines the operational code that a developer can use to produce operational events, such as assertions, verifications, logging, checkpoints, data dumps, or the like. For example, in one embodiment, C++ functions are defined for developers to use in setting operational activities within the code for any module of the application. A library called "Ops.h" is provided and developers "include" it in their individual programs (for example, by including a "#include Ops.h" line in their code). Table 1 shows a sample set of operational event functions.

TABLE 1

|  | Function Name | Description |
| --- | --- | --- |
| Assertion | OPS_DBG_ASSERT( ) | Sets a debugging assertion. |
|  | OPS_DBG_ASSERT_MSG(string) | Provides a string message. |

TABLE 1-continued

| | Function Name | Description |
|---|---|---|
| Verification | OPS_VERIFY( ) | Provides a standard verification. |
| Logging | OPS_FATAL_ERROR_MSG(string) | Provides a string describing a fatal error. |
| | OPS_ERROR_MSG(string) | Provides a string describing an error. |
| | OPS_WARNING_MSG(string) | Provides a string describing a warning. |
| | OPS_INFO_SUMMARY_MSG(string) | Provides a summarized informational message. |
| | OPS_INFO_DETAIL_MSG(string) | Provides a detailed informational message. |
| Checkpoints | OPS_CHECKPOINT_MSG(string) | Marks a significant step, event, and progress in a process in business logic. |
| Data Dumps | OPS_DUMP_MSG(string) | Dumps a set of data to an output for debugging purposes. |

In one embodiment, the operational events are specified for two modes of operation, general mode and debug-only mode. For example, a set of functions can be defined for general operation, e.g., functions beginning with "OPS_", and a second set of functions can be defined for debug-only mode, e.g., functions beginning with "OPS_DBG_" with the remainder of the function name being the same for both modes. By way of illustration, the functions in Table 1 for logging are also be specified with the "OPS_DBG_" prefix as shown in Table 2. This second set includes functions that provide similar operational functionality but only take effect in debug mode.

TABLE 2

| | Function Name | Description |
|---|---|---|
| Logging | OPS_DBG_FATAL_ERROR_MSG(string) | Provides a string describing a fatal error during debug mode. |
| | OPS_DBG_ERROR_MSG(string) | Provides a string describing an error during debug mode. |
| | OPS_DBG_WARNING_MSG(string) | Provides a string describing a warning during debug mode. |
| | OPS_DBG_INFO_SUMMARY_MSG(string) | Provides a summarized informational message during debug mode. |
| | OPS_DBG_INFO_DETAIL_MSG(string) | Provides a detailed informational message during debug mode. |

In order to minimize the impact on the overall system performance, the generation of operational events should be very fast. In one embodiment, debug-only alternatives for the different event types are provided so that they can be used to suppress computationally intensive operational events from release builds. In one embodiment, debug-only alternatives are only used for such significant performance impacting events. Additionally, since the operation code will remain in the release builds, developers are cautioned not to embed messaging events that may produce private or confidential information, even in debug mode. Although it would be possible to check for the content of these messages, generally, the Operations Manager 200 is not required to detect or prevent when this happens.

Additionally, in one embodiment, operational events contain a time stamp so that, if threads contending for the same operational behavior cause events to be output in the wrong order, the timestamp can be used to show the true order of events and resolve any threading contentions.

According to one embodiment, a Reporting API 202 is designed to resemble familiar operational tools, such as assertions, tracing and logging, using the C++ programming language. In this embodiment, the Reporting API 202 includes the following C++ class definitions and corresponding functional aspects. It should be noted that in one embodiment, the C++ library extension "Boost" (boost.org) is available for the code development. Among the Boost libraries of particular importance are the boost::any type, the boost::shared_ptr and the boost::weak_ptr smart pointers, and the boost::regex. Alternative conventional C++ libraries can also be used with respect to this embodiment, for example, for regular expression matching the Henry Spencer regular expression library can be used instead of the boost::regex library.

Reporting API Classes

According to one embodiment, there are two main classes in the Reporting API 202, the "Ops" class and the "LocalOps" class. Both provide functions for performing the various operational tasks. In this embodiment, the Reporting API 202 classes are associated according to the class diagram shown in FIG. 3.

The Ops class 310 is a singleton; it houses functionality that does not keep state from call to call. Generally, these are the logging and assertion functions, e.g., Assert( ) 311, Verify( ) 312, Message( ) 313, and ReportEvent( ) 314. In one embodiment, the Ops class 300 ultimately is the receiver of all operational events. LocalOps class 320, for instance, will forward its events to Ops 310 for processing.

The LocalOps class 320 is used for the function tracing part of the Reporting API 202. The LocalOps class 320 keeps states from call to call. When it is constructed, the LocalOps class 320 reports that the called function was entered. When it is destroyed, e.g., as the function exits, it reports that the function is exiting. LocalOps 320 ultimately forwards all of its calls to the Ops 310 singleton class.

Both classes, Ops 310 and LocalOps 320, define member classes named "xxxxxFunctor." The LocalOps class 320 also provides member functions for reporting the "status" to be returned from the function, e.g., ReprotStatusCodeFunctor class 330 and ThrowStatusCodeFunctor class 340. Similarly, the Ops class 310 provides member classes MessageFunctor 350 and AssertFunctor 360.

These member classes are used in the implementation of various macros to provide the illusion that the macros take variable "printf-style" parameters. Essentially, when the user sees a macro it may appear that what follows the macro name is a parameter list for the macro, but this is not the case. For example, consider the macro OPS_MESSAGE ( ) 313 in the following statement:

OPS_MESSAGE (_T("Error could not open file % s"), fileName);

it may appear that what follows OPS_MESSAGE 313 is a parameter list for the OPS_MESSAGE macro 313. However, in actual operation the OPS_MESSAGE 313 part of the statement is a macro that simply creates an instance of one of the "Functor" classes, e.g., MessageFunctor 350, passing information about the source code context, such as the file name, line number, function signature, and the like to the constructor. The parameter list, or the part between the parentheses (including the parentheses) is not a parameter list for the OPS_MESSAGE macro 313, but is a call to the function call operator, "operator ( ) 351," of the Functor class MessageFunctor 350, which has a variable-length argument list for the printf-style parameters. Similarly, OPS_Assert( ) 311 performs a macro function call to the AssertFunctor class 360 with its corresponding operator( ) 361.

In one embodiment, the Reporting API 202 is designed to provide all the operational events an application developer may require. In one embodiment, the operational events provided are tracing, logging (or messaging), assert and verify. Alternative embodiments provide additional and different sets of operational events.

Figure 3:
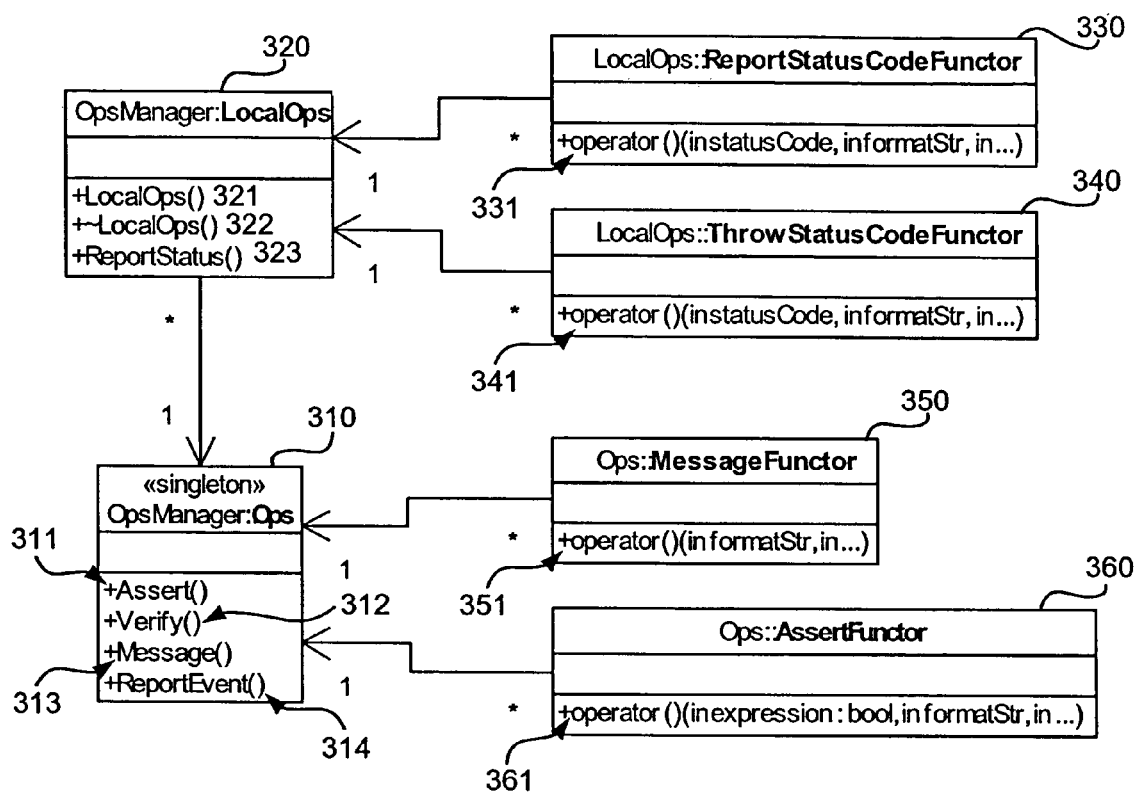
FIG. 3 is a class diagram of one embodiment of a Reporting application programming interface.

Tracing—In this embodiment, function tracing is carried out automatically when the user creates an instance of LocalOps 320 at the beginning of a function in a local variable. A "trace in" message is immediately sent upon creation of the LocalOps 320. The scope of the local variable will determine when the "trace out" message is sent. When the LocalOps 320 variable goes out of scope, the destructor of LocalOps 320 is called and it sends the "trace out" message. A third trace message, "trace status", is sent before the "trace out" message, when the system reports the status at the end of the function, before returning or throwing and exception. LocalOps 320 provides several ways to report this status, allowing the program to pass a "Status" object, or pass a "StatusCode" value with a string type message (which uses the LocalOps:: ReportStatusCodeFunctor 330 as shown in FIG. 3). The Reporting API 202 defines convenience macros for throwing an exception that wraps a Status object, and several other macros for reporting common errors.

Messaging (Logging)—In one embodiment, the Operations Manager subsystem 200 defines the logging events it provides in terms of messaging functions. In the Operations Manager 200 design, the output medium or other operational behavior is decoupled from the Reporting API 202 and left to the Subscription API 204.

With respect to the Messaging operational event, the developer specifies a "level" characteristic for a message. As described below, the Subscription API 204 provides the ability to filter based on message levels. In this embodiment, the Messaging levels defined are in Table 3.

TABLE 3

| Level | Description |
|---|---|
| Info Detail | verbose output that other users would usually not want to see |
| Info Summary | useful but terse information |
| Warning | information that indicates a possible problem |
| Error | reports a recoverable error |
| Fatal Error | reports an unrecoverable error, likely requiring the application to abort |

These levels are provided in one embodiment of a Reporting API 202 by way of example. Any other levels are possible and can be defined in like manner.

At each specified level, printf-style macros are provided for logging any of the messages the developer may want to specify in his program. In addition, as described above, a debug-only version of each messaging macro is also provided. The debug-only macros are removed from the code at compile time when the application is not being operated in debug mode. In one embodiment, the debug-only versions are used when performance is a concern, i.e., when the operational event would cause significant performance degradation beyond what would be acceptable for a release quality build. Otherwise, general mode operational code can be used. The Subscription API 204 is generally responsible for turning logging on and off at runtime rather than using the compiler.

Assert and Verify—Assert and Verify are similar operational actions, both reporting an event when a specified condition evaluates to false or an equivalent numeric value (e.g., zero). In one embodiment, as a default policy, an assertion is only evaluated in debug builds, while a verify event is evaluated in debug and release builds. Because generally an assert event is not evaluated in a release build, assert events are designed so that they do not return a value that can be used in an expression, e.g., the control expression of an "if" statement. Verify events, on the other hand, are always evaluated, both in debug and release builds, so that they are designed to evaluate to a Boolean expression, and can be used in Boolean expressions such as an "if" statement. These design restrictions are particular to one embodiment described and are not required in alternative embodiments that lack these default evaluation rules for assert and verify events.

In alternative embodiments, further operational events can be provided in the Reporting API 202, e.g., check-pointing, data dumps, and the like. It is up to the designer of the Operations Manager 200 implementation to define the operational tools that will be available to application developers of the software.

With some exceptions, the operational code infrastructure can remain enabled in release builds. Unlike prior art approaches, the compiled release build of the software application includes the operational code since the output mechanisms and/or operational policy are decoupled from the client code itself. Accordingly, the operational code infrastructure can subsequently be used through the Operations Manager 200 subscription services, not only by developers during the application development cycle but also by others who are able to provide customized subscriptions to access the output of the embedded operational code. For example, customer support representatives can turn on logging in release builds at a customer site for diagnostic purposes. As another example, quality assurance ("QA") engineers can turn on logging for specific features and provide meaningful information to developers as they encounter problems. As yet another example, QA engineers can compare output of information in successive runs of the application to check for accidental loss of functionality as the program is developed.

Subscription Services

The Operations Manager subsystem 200 decouples the generation of operational events, such as logging, assertions, tracing, and the like, from the operational behavior for which the information associated with the operational event is used, e.g., logging to file, displaying in the screen, beeping, breaking the execution, or the like. The subscription services handle the operational policy aspects that dictate the operational behavior to trigger for the events generated by the reporting services. This separation between the events and the output policy allows the definitions of what should be output, at what times, and to what media, to change dynamically and over time without having to rebuild the code. Further, the decoupling of the operational policy from the operational code enables the Operations Manager 200 to dynamically update the policies even during runtime without impacting the application code.

The Operations Manager subsystem 200 can provide subscription services as a software API, as configuration files, or as combination of these two. The configuration files can be edited to add, change, and delete subscriptions to operational events defined through the Reporting API 202. Once the operational events are included in the application through operational code as described above, subscriptions to those events can be made selectively by filtering the events, for example based on fully-qualified function names, verbosity or severity levels, and types of event, and the like.

Subscription Configuration Files

According to one embodiment, the Subscriptions services are provided in subscription configuration files. During execution of an application, the Operations Manager 200 constantly monitors the subscription configuration files to detect any changes and modifies the operational policy accordingly. The changes of the operational policy are made dynamically without interruption of the application execution.

Any number of subscription configuration files can be used to specify the operational policy. In one embodiment, a single subscription file includes all the subscriptions for a particular application. The file is monitored and the policy updated upon changes in this file. In multi-file embodiments, files with particular names or placed in a particular directory are monitored by the Operations Manager 200 and their contents parsed and combined according to the particular design of the Operations Manager 200.

In one embodiment, a two-file subscription configuration file system is used. This embodiment is intended for a distributed and cooperative application development environment. In this embodiment, a "mandatory" subscription configuration file is provided with a minimum set of subscriptions for critical operational events. A second subscription configuration file is allowed to indicate customized subscriptions by developers and others in the development environment. Both of these files are located in the main executable directory of the particular application, e.g., "APPexe" directory. The Operations Manager 200 monitors these two files to detect any changes in operational policy. In another embodiment, for security reasons the application's subscription information is encoded so that the casual end user can't find the subscription information by simple inspection of files. It should be noted that although some embodiments may require one or more mandatory subscription configuration files, the mandatory nature of the file is not a requirement to implement the described functionality. For example, in one embodiment, those doing development, QA, and Support roles create as many policy files as they require and add them to the encoded application policies. In this embodiment, subscription information is not mandatory but simply optional.

In one embodiment, the mandatory subscription configuration file is unique for the application, for example, the release configuration management team may specify this file for a given application release. This unique mandatory file can be changed for each release level of the code (i.e., debug, beta, release, or the like). In one embodiment, the mandatory subscription configuration file is called "APPOps.cfg" but other names or naming conventions are equally possible, e.g., .ops files, or the like.

For a typical cooperative development environment, this file should be owned and configured by one entity, e.g., the Operations Manager 200 designer, a quality assurance team, the release configuration management team, or the like. In order to serve its purpose all the application code developers must use the mandatory subscription configuration file. The use of the mandatory file is a convenient approach for cooperative development but not a functional requirement of the system.

In an alternative embodiment, the use of configuration files is optional. Instead of a configuration file, a software API is used to set the minimum subscription policies for a code release. Configuration files are then optional and generally used by developers, QA, support teams, and the like. For example, the release configuration management team sets the minimum subscription policies through the API and the developers, QA, and support teams are free to optionally provide .ops configuration files. Thus, this approach does not require a mandatory subscription file.

The operational policy requirements for an application often change depending on where the application is in its lifecycle. Pre-beta versions will generally require more logging by default than beta versions. Earlier releases will pop up invasive notifications when assertions fail. Conversely, these notifications are quietly logged to files in release builds. As a general practice, fatal errors are always logged. These basic policies differences are specified by the mandatory configuration subscription file.

In one embodiment, a mandatory subscription configuration file is generally only concerned with the minimum required operational policy and many available operational events in the code are ignored to minimize any effect on system performance. For example, in one embodiment, the assert and verify events are suppressed unless a subscriber declares an interest in the event through a user-specific subscription configuration file.

In addition, it is desirable to provide flexibility in the operational behaviors triggered by operational events. For some specific purposes or in certain situations, it is desirable to output additional information from operational events that is normally ignored or output in a less conspicuous manner. For example, a developer may want to get all the information generated by operational events in his or her software module for debugging purposes; a quality assurance technician may want additional information related to a particular function or a particular level of message; a technical support technician may want more detailed reports dealing with a failure at a customer site. For these and similar purposes, user-specific subscription configuration files are offered as part of the subscription services of the Operations Manager subsystem 200.

User-specific subscription configuration files are allowed for individual developers or others in the development and support team wanting to subscribe to operational events for their any particular purpose. The user-specific configuration file is optional and owned and configured by each individual user, i.e., developer, groups of developers, QA engineer, or anyone interested in testing and debugging the code. In one embodiment, this optional file is for example called "UserOps.cfg" while in another embodiment consisting of entirely optional files, the configuration files can have any name followed by the .ops extension to be identified as an operational policy configuration file.

For example, in one embodiment, the UserOps.cfg, is included in the APPexe directory. This file is checked for at runtime; if it exists, it is parsed after the mandatory configuration file, e.g., APPOps.cfg, having the effect of being appended to the bottom of the mandatory file. Subscriptions in the user-defined configuration file do not override the policies in the mandatory configuration file; each "subscription" is additive over existing ones. In one embodiment, no provision is made to turn off or divert previous subscription output. Where more than one subscription would cause the same event to be output to the same medium, duplicates are suppressed. Further, when changes are detected during the execution of the application, existing subscriptions originating from the changed file are cancelled and replaced with the new subscriptions made in their place. Similarly, an alternative embodiment includes an API to specify the minimum required subscriptions and .ops files are used to provide user-defined subscriptions to be added. The application periodically checks for .ops files and parses as described above.

Although any suitable format may be used, in a preferred embodiment, the subscription configuration files are in Extensible Markup Language ("XML") format. For example, the subscription configuration files conform to the following document type definition ("DTD"):

```
<!ELEMENT OpsConfiguration (Subscription*)>
<!--multiple Conditions indicate AND logic. To get OR
    logic, make separate Subscriptions-->
<!ELEMENT Subscription (Condition+)>
<!ATTLIST Subscription
   filename CDATA #IMPLIED
   debugout (true|false) "false"
   break (true|false) "false"
   alert (true|false) "false"
>
<!ELEMENT Condition EMPTY>
<!ATTLIST Condition
   level (info-detail|info-
summary|warning|error|fatal)
   #IMPLIED
   type (all|message|trace|assert|verify) #IMPLIED
   functionMask CDATA #IMPLIED
>
```

This DTD describes the syntax of one embodiment of an Operations Manager 200 subscription configuration file. In this embodiment, the DTD defines the following tags:

OpsConfiguration—This is the root element of the configuration file. The file contains one OpsConfiguration tag at the root level. This element provides the basic filtering mechanism. This tag contains zero or more Subscription tags.

Subscription—This element enters a subscription for events that match a set of conditions enumerated in child Condition tags. Events matching all of the Conditions trigger the actions specified in the attributes of a Subscription. Table 4 shows a sample set of attributes. All of the attributes are optional, but unless one is specified, nothing will happen with the events matching this subscription. Each attribute represents an action that may be taken and is given all of the information about an operational event, but each attribute uses the information differently.

TABLE 4

| Attribute Name | Value | Description |
|---|---|---|
| Filename | File name | When this attribute is specified, events matching the conditions in this subscription will be output to the file specified by the file name provided. Note that if the same file is specified in other subscriptions, the filename should be specified in the same way to avoid unpredictable behavior. Although a consistency check could be added, in this embodiment it is up to the user to specify files consistently. |
| debugout | True/False | If this value is "true", matching events will be logged to the platform's default debug output. |
| Break | True/False | If this value is "true", the program will break on matching events, close to the point where the event occurred. |
| alert | True/False | If this value is "true", the program will alert the user with a message when an event matches this Subscription. |

Condition—A condition tag is a child of a Subscription. There may be one or more Condition tags in a Subscription. When there are multiple Condition tags, a logic AND operator is applied to the Conditions (i.e., the Conditions are logically "ANDed" together), making a filter that is potentially more restrictive. Each Condition tag may contain any or all of the attributes listed in Table 5. Each attribute is actually a separate condition; when multiple attributes are specified, each is logically ANDed as if they were specified in separate Condition tags. Preferably, in one embodiment, at least one attribute should be specified in each Condition tag.

TABLE 5

| Attribute Name | Value | Description |
|---|---|---|
| level | info-detail/ info-summary/ warning/ error/ fatal | This attribute represents the levels of interest an event might have. When a level is specified, all of the levels with a higher degree of interest are included implicitly. For instance, if a level of "warning" is specified, "error" and "fatal" are included as well. The level attribute can be omitted. |
| type | All/ Message/ | This attribute limits a Subscription to events of a specific type. The type attribute can be omitted. |

TABLE 5-continued

| Attribute Name | Value | Description |
|---|---|---|
| functionMask | Trace/ Assert/ Verify Not Applicable | This attribute limits a Subscription to only those events originating in functions whose fully qualified name matches the regular expression specified in the value. The value is a regular expression as defined by the Henry Spencer regular expression library. The regular expression specified here will be treated as case insensitive. It does not need to match completely the fully qualified function name; the expression merely needs to match a substring of the fully qualified name. The fully qualified name will be of the form "Namespace1::NamespaceN::Class1::ClassN::FunctionName". If the regular expression is not well formed, the Operations Manager 200 will send notification via the "debugout" and the "alert" actions. |

In one embodiment, with respect to the level attribute, each of the possible values that indicate the degree of interest is further described in Table 6. These values correspond to the levels of the Reporting API 202 shown in Table 3.

TABLE 6

| Value Tag | Description |
|---|---|
| info-detail | This value is the most verbose, and if developers have categorized their messages properly, is the only level that will be verbose. This value matches all events, and is equivalent to leaving it out altogether. |
| info-summary | This value specifies interest only in "interesting" information. Items with a level of "info detail" will be excluded. |
| warning | This value specifies interest only in warnings and errors |
| error | This value specifies interest in errors only. |
| fatal | This value specifies that a fatal error has occurred. Usually, if this level of event is received, the application will shortly terminate. However, Operations Manager 200 will not cause the application to terminate. It is up to the code handling the error to make that happen. |

In one embodiment, with respect to the type attribute, each of the possible values that indicate the type of event is further described in Table 7.

TABLE 7

| Value Tag | Description |
|---|---|
| all | This gets all events of all types, and is the same as omitting the type attribute. |
| message | This limits the Subscription to only message (log) events, which originate in the Ops class |
| trace | This limits the Subscription to only trace messages, which originate in the LocalOps class. |
| assert | This limits the Subscription to only assertion failures, which originate in the Ops class. |
| verify | This limits the Subscription to only verify failures, which originate in the Ops class. |

The following is a sample "mandatory" subscription configuration file for Pre-release builds according to one embodiment:

```
<?xml version="1.0"?>
<OpsConfiguration>
    <!-- log all warnings and errors -->
    <Subscription filename="debug.log" debugout="true">
        <Condition level="warning"/>
    </Subscription>
    <!-- pop up a message when an assertion fails -->
    <Subscription alert="true" filename="debug.log"
        debugout="true">
        <Condition type="assert"/>
    </Subscription>
    <!-- show verify failures in debug output -->
    <Subscription debugout="true">
        <Condition type="verify"/>
    </Subscription>
</OpsConfiguration>
```

The following is a sample "mandatory" subscription configuration file for Beta builds according to one embodiment:

```
<?xml version="1.0"?>
<OpsConfiguration>
    <!-- log all warnings and errors -->
    <Subscription filename="debug.log" debugout="true">
        <Condition level="error"/>
    </Subscription>
    <!-- pop up a message when an assertion fails -->
    <Subscription alert="true" filename="debug.log"
        debugout="true">
        <Condition type="assert"/>
    </Subscription>
</OpsConfiguration>
```

The following is a sample user-defined subscription configuration file according to one embodiment. For example, a developer while working on a database module code may use this sample file. This sample file logs all events where the originating function's fully qualified name contains "DB" or "Database" in a namespace or class name.

```
<?xml version="1.0"?>
<OpsConfiguration>
    <!-- log all database stuff -->
    <Subscription filename="debug.log" debugout="true" >
```

```
        <Condition functionMask="(DB | Database).*\:\:"/>
    </Subscription>
</OpsConfiguration>
```

The following is another sample user-defined subscription configuration file according to one embodiment. For example, a QA engineer working on the database module code might add an additional constraint that only warnings and errors should be logged, and they might turn off "debugout" if they don't have access to a debugger.

```
<?xml version="1.0"?>
<OpsConfiguration>
    <!-- log all database stuff -->
    <Subscription filename="debug.log" >
        <Condition functionMask="(DB | Database).*\:\:"
            level="warning" />
    </Subscription>
</OpsConfiguration>
```

In a preferred embodiment, another suitable format for the subscription configuration files are in Extensible Markup Language ("XML") format. However, in this embodiment, a DTD is not required because there is no fixed grammar for the subscription configuration files. It should be noted that an XML file without a fixed schema is still considered a well-formed XML, however it is not a "validatable" XML. In this embodiment, .ops files include custom tags that may have previously not existed. An add-on interface further described below provides a mechanism to increase the number of tags and defining new tags as new operational behaviors and conditional filters are added.

In the grammar of these XML .ops subscription configuration files, there are action tags and filter tags. Action tags specify behavior and contain child tags called Filter tags that specify under what conditions the behaviors are manifest. For example, in one embodiment, the filter tags correspond roughly to the attributes in the DTD of the subscription configuration files described above.

According to this embodiment, the filter/child tags are specified with a set of attributes of their own. For example, in one embodiment an action called ACTION_A is registered through the add-on interface. A filter called FILTER_1 is also registered through the add-on interface and a policy file that uses the newly registered action and filter is specified as follows:

```
<?xml version="1.0" ?>
<OPS>
    <!--0 or more policies (actions) go here-->
    <ACTION_A an_attribute="a value">
        <!--0 or more filters go here-->
        <FILTER_1 some_attribute="some_value"/>
    </ACTION_A>
</OPS>
```

In this embodiment, filters can be combined so that conditions in each of the filters can be logically related. For example, two filters can be combined with a Boolean AND function to require that both filters must evaluate to logical true for the action to take place. Using the example above, a Boolean AND in a subscription configuration file is specified as follows:

```
<?xml version="1.0" ?>
<OPS>
    <ACTION_A an_attribute="a value">
        <FILTER_1 some_attribute="some_value"/>
        <FILTER_2/>
    </ACTION_A>
</OPS>
```

Similarly, to effectuate a Boolean OR relationship between filters a mechanism is provided. In each .ops file, more than one action can be specified. For example:

```
<?xml version="1.0" ?>
<OPS>
    <ACTION_A an_attribute="a value">
        <FILTER_1 some_attribute="some_value"/>
        <FILTER_2/>
    </ACTION_A>
    <ACTION_A an_attribute="a value">
        <FILTER_3/>
    </ACTION_A>
    <ACTION_B an_attribute="a value">
        <FILTER_3/>
    </ACTION_B>
</OPS>
```

Using the possibility to specify the same action with a different combination of filters provides the ability to OR the filters. For example, if the same action is mentioned more than once with different filters, the action will occur if either set of filters matches the action to take place. Similarly, in this embodiment, many .ops files can exist and none is necessarily required. All files ending with .OPS are parsed and their policies are combined resulting in similar logical relationships between .ops files.

In one embodiment, the following action tags shown in Table 8 are implemented. However, it should be noted that other tags can be dynamically added through the add-on interface.

TABLE 8

| Action Tag | Description |
| --- | --- |
| <LOG_TO_FILE filename="file name"> | causes information from the originating OPS macro to be output to the specified file |
| <LOG_TO_DEBUG_OUTPUT> | causes information from the originating OPS macro to be output to a debugger output window, if any |
| <ALERT_USER message = "optional message text"> | causes information from the originating OPS macro to be output to a pop-up window, along with the contents of the message attribute if it exists |
| <FAIL> | causes the application to terminate |
| <BEEP> | causes a speaker tone to be emitted |
| <BREAK> | breaks program execution and enters the debugger |

Each of the above actions, if they don't have any filters, will happen on every OPS macro. Filters limit the actions to specific OPS macros. The following filter tags shown in Table 9 can be placed as child tags of the above action tags in any combination. More can be added through the add-on interface.

TABLE 9

| Filter Tag | Description |
| --- | --- |
| <EVENT_TYPE_FILTER type = "event type"/> | only allow events of the specified type to be output. Types correspond to the different macros. Types are "MESSAGE", "ASSERT", "VERIFY", "FUNC_ENTER", "FUNG_EXIT", "FUNC_STATUS", "CHECKPOINT", "DUMP" |
| <LEVEL_FILTER level = "level"/> | for events of type "MESSAGE", this can be used to further limit the events to only those of a certain level. Levels are "LVL_INFO_DETAIL", "LVL_INFO_SUMMARY", "LVL_WARNING", "LVL_ERROR", and "LVL_FATAL_ERROR". A specified level matches messages of that level and above, so "LVL_WARNING" will match OPS_WARNING_MSG, OPS_ERROR_MSG, and OPS_FATAL_ERROR_MSG macros. |
| <MESSAGE_FILTER regexp="regular expression" /> | only allows OPS events whose messages match the regular expression. So, a MESSAGE_FILTER with regexp = "e.*tion" will match OPS_ERROR_MSG("education") and OPS_WARNING_MSG("elation") but not OPS_WARNING_MSG("erudite"). |
| <FILE_NAME_FILTER regexp="regular expression" /> | only allows OPS events found inside of source code files whose file name matches the regular expression |
| <FUNC_NAME_FILTER regexp="regular expression" /> | only allows OPS events found inside of functions whose function name matches the regular expression |
| <FUNC_SIG_FILTER regexp="regular expression" /> | only allows OPS events found inside of functions whose function signature (which includes the name of the function, its return type and its parameter types) matches the regular expression |
| <NUM_LOCK_FILTER/> | only allows OPS events that happen while the NUM LOCK key on the keyboard is pressed. |

The following is a sample user-defined subscription configuration file (.ops) according to one embodiment. For example, this .ops file would capture all error messages that occur in the source code file MyFeature.cpp, and logs them to a file called MyFeatureErrors.log.

```
<?xml version="1.0" ?>
<OPS>
    LOG_TO_FILE file_name="MyFeatureErrors.log">
        <EVENT_TYPE_FILTER type="MESSAGE"/>
        LEVEL_FILTER level="LVL_ERROR"/>
        FUNC_NAME_FILTER
            regexp="MyFeature\.cpp"/>
    </LOG_TO_FILE>
</OPS>
```

Subscription API

In another embodiment, the subscription services are provided in a programmatic interface useful for creating custom tools. This programmatic interface is the Subscriptions API 204. Alternatively, in another embodiment, a combination of both, a Subscription API 204 and an XML file-based mechanism for configuring subscriptions to events is provided. Under this approach, the XML file-based mechanism generally follows the subscription configuration file approach described above.

The Subscription API 204 provides a programmatic interface with equivalent functionality to that provided by the configuration file mechanism described above. This is provided to allow the Operations Manager subsystem 200 to be extended across multiple design platforms.

Subscription System Classes

Figure 4:
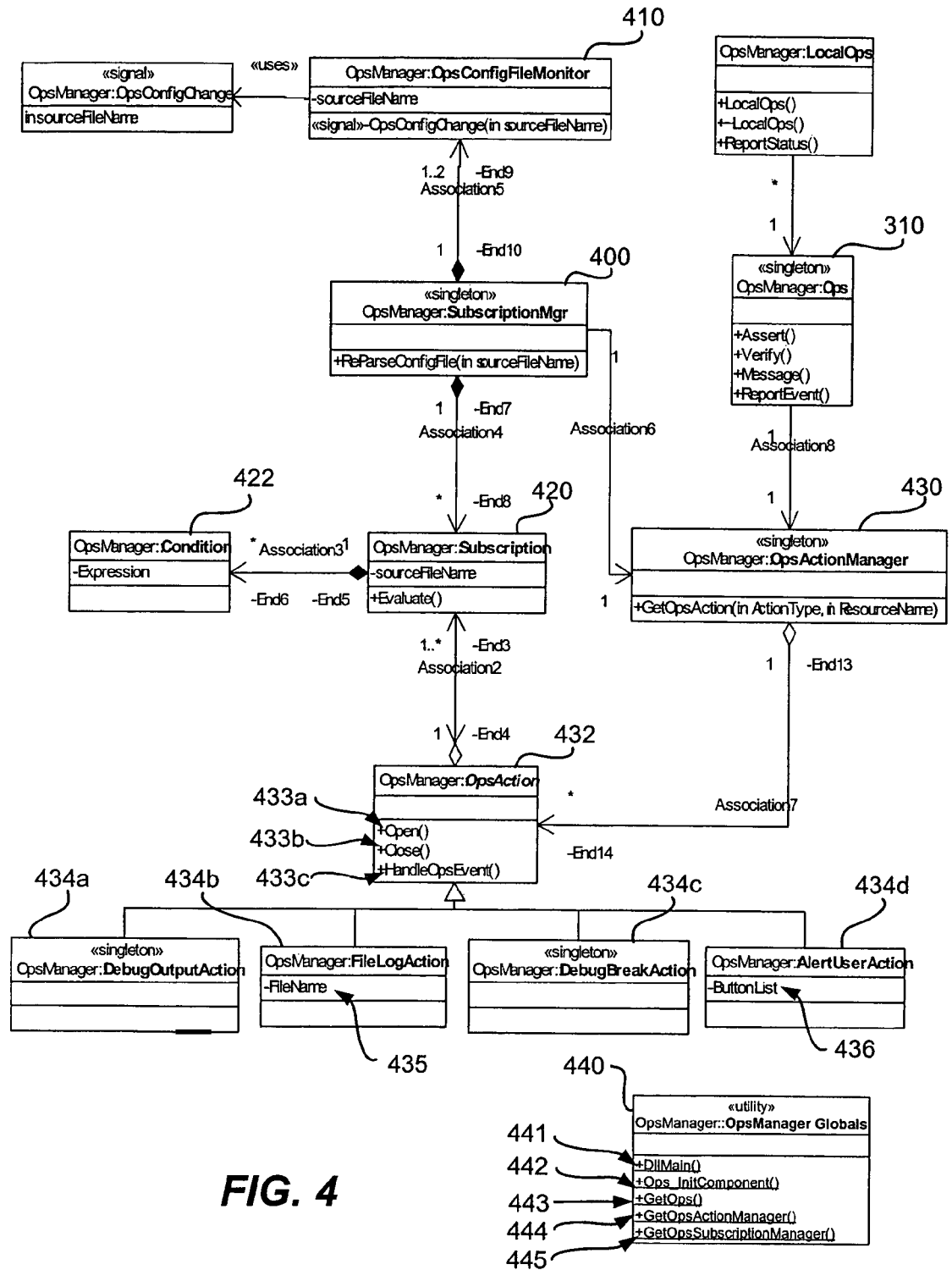
FIG. 4 is a class diagram of one embodiment of a Subscription application programming interface.

The Subscription API 204 includes several new program classes. FIG. 4 shows a class association diagram for a sample set of Subscription API classes according to one embodiment using the C++ programming language. Although the same functionality can be provided in any other programming language, a description of this preferred embodiment based on C++ is provided below for illustrative purposes.

The SubscriptionManager 400 parses subscription configuration files at startup time and when the configuration files change. This class creates new Subscription 420 objects based on each configuration file. If the files change, the SubscriptionManager 400 creates new Subscription 420 objects based on the changed file and deletes the old Subscription 420 objects from the file. It is done in that order so that OpsActions 432 remain open if they are specified in the original and changed versions of the configuration file. The SubscriptionManager 400 generally provides the top level for the Subscription API 204.

The OpsConfigFileMonitor 410 monitors a single configuration file and alerts the SubscriptionManager 400 when it detects a change to a configuration file. In a two-file embodiment, e.g., APPOps.cfg and UserOps.cfg, there are two instances of this class. In other embodiments using one or multiple configuration files, this module is modified accordingly. Having one instance per configuration file allows the flexibility of designing the Operations Manger 200 with one or more configuration files.

The SubscriptionManager 400 initiates and owns each OpsConfigFileMonitor object 410 and holds references for them, one for each configuration file. When a signal is received indicating that a configuration file has changed, the corresponding OpsConfigFileMonitor 410 object notifies the SubscriptionManager 400, which handles the changes.

The Subscription 420 object represents the unique combination of a configuration file, an OpsAction 432, and a set of Conditions 422. The Subscription 420 class corresponds to the Subscription element described with respect to the configuration files above. Its lifetime is managed by the SubscriptionManager 400. It holds a collection of Condition objects 422.

Subscription 420 owns and manages the life cycle of Condition objects 422. The Condition 422 object class is similar to the Condition element in the configuration files described above, except that an instance of this class is created for every attribute of every Condition tag in the configuration files. Multiple Conditions are logically ANDed together. To get the effect of an OR condition, a subscriber can create separate subscriptions to the same resource. For the condition object 422, multiplicity is one or more per Subscription object 420 (i.e., "*") because subscription filters can be composed of multiple conditions, e.g. funcNameFilter="Database", Level="Warning".

The OpsActionManager 430 assures that only one instance of each action specified in the various subscriptions of the configuration file is created using the special pointer features of the "Boost" library. In one embodiment, the OpsActionManager 430 is not included.

Each created action is an instance of OpsAction object 432. OpsActions 432 are abstractions for behaviors that are invoked for operational events. An OpsAction object 432 can be associated with one or more Subscription objects 420. The OpsActionManager 430 creates all OpsAction objects 432 and keeps a master list of them via a collection of special weak pointers, boost::weak_ptrs. The OpsActionManager 430 does not delete any of the OpsAction objects 432. The lifetime of each OpsAction 432 is managed through Boost shared pointers, boost::shared_ptrs, which are held by the Subscription objects 420. The OpsAction 432 has a list of the Subscription objects 420 that subscribe to it. When all Subscriptions 420 to an OpsAction 432 are discontinued, the reference count of the shared pointer goes to zero and the OpsAction 432 is destroyed.

The OpsActionManager 430 keeps a weak_ptr to each created OpsAction 432, whether it still exists or not. When a new Subscription 420 is created, the SubscriptionManager 400 asks the OpsActionManager 430 for a shared_ptr to whatever OpsAction 432 is specified. The OpsActionManager 430 first checks to see if it has a weak_ptr to the specified action in its list. If it does, it tries to resolve it to a shared_ptr. If there is such an OpsAction 432 in use, the weak pointer is successfully resolved, allowing the OpsAction 432 to be reused. If the reference count to that OpsAction 432 has gone to zero, however, the resolve fails because the object has been destroyed.

In that case or when the request is for an action not previously created, the OpsActionManager 430 creates a new instance of the OpsAction object 432 requested, returns to the SubscriptionManager 400 a shared_ptr to the new instance, and refreshes or creates a weak_ptr to it in its list.

This use of Boost library pointers allows the lifetime of the OpsAction object 432 to be managed by the Subscriptions 420 that share it, and allows a way for the shared OpsActions 432 to be located and reused with other Subscriptions 420 that need to share it. This feature also allows the OpsActionManager 430 to assure that no two OpsActions 432 control the same output resource. For instance, in one embodiment there can only be one instance of DebugOutputAction 434a, and there can only be one instance of FileLogAction 434b for a given path name or file.

When an operational event occurs, the event is forwarded by the Ops singleton 310 to the OpsActionManager 400, which in turn locates the OpsActions 432 in its list and forwards the event to each of them. When SubscriptionMgr 400 needs to request a reference to an OpsAction 432, it calls the GetOpsActionManager( ) 444 in the global OpsManagerGlobals class 440. Each OpsAction 432 will query the Subscriptions 420 in its list to see if any of them has a set of Conditions 422 that matches the event. If a Subscription 420 is found that does match the event, the associated action is triggered.

Notifying the OpsAction 432 first rather than the Subscription 420 prevents duplication of event handling caused by multiple Subscriptions 420 pointing to the same OpsAction 432. That is, an action is triggered for an event only once, regardless of how many Subscriptions 420 there are to that action. Since the OpsAction 432 association to Subscription 420 has a multiplicity of 1, there will not be more than one OpsAction 432 for a given Subscription 420. If there is a desire to have a single set of conditions trigger multiple operational behaviors, they can create separate subscriptions 420 with the same conditions, or they can create a new operational behavior that combines them. OpsAction 432 includes several subclasses 434, which dictate the output mechanisms available to subscribers. In alternative embodiments, in addition to the subclasses discussed below Operations Manager 200 designers can include additional subclasses as desired.

DebugOutputAction 434a outputs OpsEvent information to the Debugger output window. The information is output beginning with the file name and line number so that the reader can double-click on the line to go to the place in the source code that the event occurred. Generally, in single debugger output window environments, there is no need to have more than one instance of this subclass, since there is are no parameters that can differentiate one instance from another.

FileLogAction 434b logs operational event information to a file specified by the "FileName" parameter 435. As discussed above, the OpsActionManager 400 assures that each unique path name specified in the subscription configuration files gets its own instance of this OpsAction subclass 434. It should be noted that it is possible to have two FileLogActions 434b that write to the same file if two different paths to the same file are specified in the configuration file. As mentioned above, it is preferable for subscribers to take care to avoid this. Although possible, in a preferred embodiment the OpsActionManager 400 will not normalize the paths to assure only one object per log file.

DebugBreakAction 434c does not output any information, but triggers a breakpoint in the source code.

AlertUserAction 434d outputs operational event information to a dialog box (e.g., pop-up window). By default, the dialog box has an "OK" button, but the subscriber can add "Abort" and "Break" buttons in the subscription file using the ButtonList parameter 436.

Figure 5:
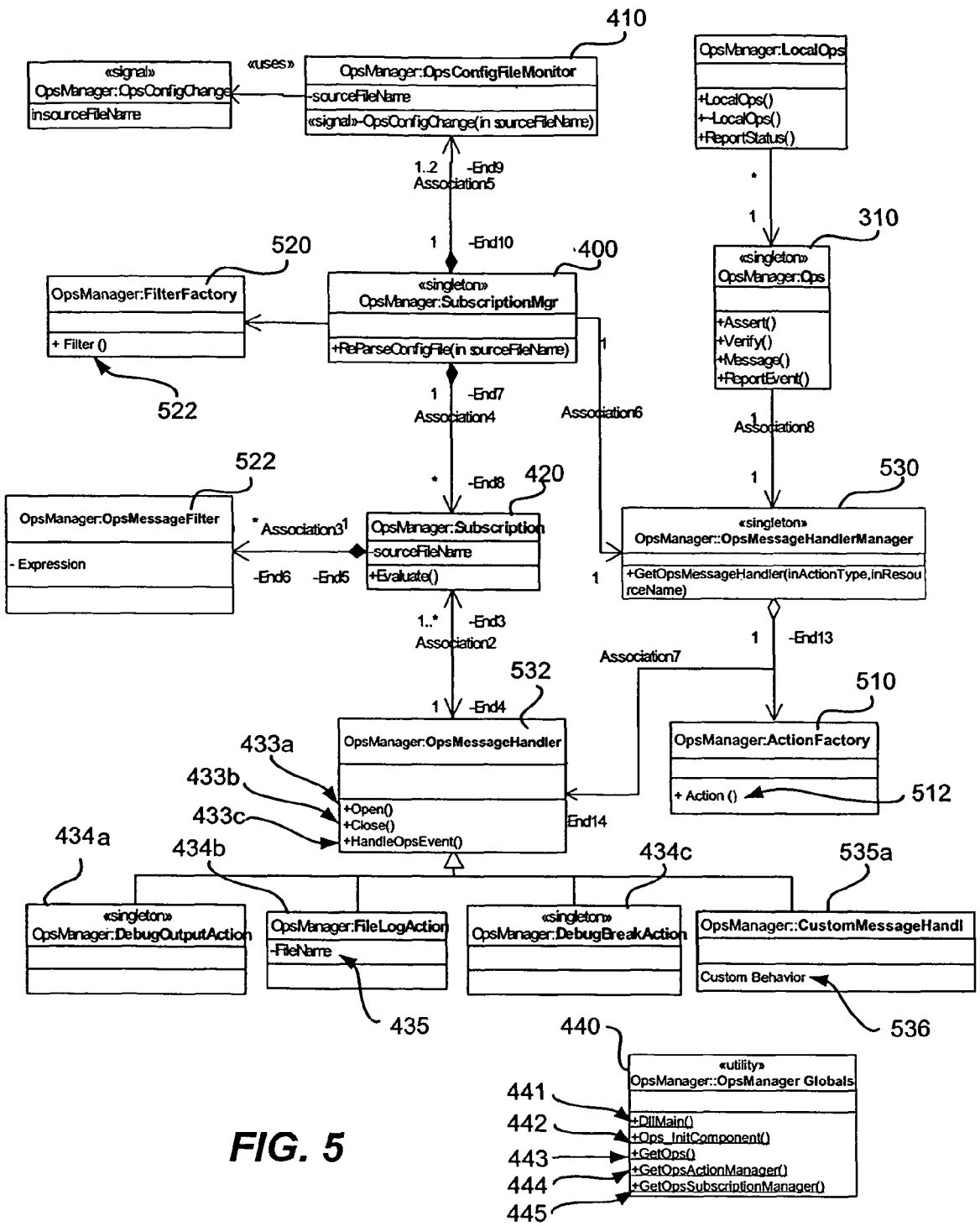
FIG. 5 is a class diagram of an alternative embodiment of a Subscription application programming interface.

Now referring to FIG. 5, a class diagram of an alternative embodiment of a Subscription application-programming interface is shown. According to this embodiment, the operation policies are open-ended. An add-on interface is provided for the user to specify custom actions or behaviors not originally provided at the time that the ops manager system was built. According to this embodiment, for each new action, the user provides an object called "Factory" whose purpose is to create an instance of the new action object.

The users register the Factory object with the OpsMessageHandlerManager 530. In this embodiment, the OpsMessageHandlerManager 530 performs the functions of the OpsActionManager 430 described with respect to FIG. 4. In addition, the OpsMessageHandlerManager 530 registers Factory objects 510 to create new operational actions 512.

As the SubscriptionManager 400 parses a subscription configuration file (.ops), if an action tag is not recognized, the SubscriptionManager 400 checks with the OpsMessageHandlerManager 530 to look up the if the action tag registered under the unrecognized tag name. If the OpsMessageHandlerManager 530 finds the tag in its tag registry, it calls the custom Factory 510 associated with that tag to create an instance of the new custom Action Object 535*a*.

Both the custom Factory 510 and the custom Action Object 535*a* are created by the user ahead of time and registered with the OpsMessageHandlerManager 530 through its API. Then, the user includes the newly created tag in a configuration file (.ops) with any of the available filters. Accordingly, events that match the filter criteria specified in the .ops file associated with the newly created Action tag are associated with the Action Object 535*a* and the associated operational policy behavior 536 defined by the user is performed. This add-on interface allows user to specify custom behaviors 536 not previously provided by the operations manager system.

For example, to create a custom action that checks the system's memory for errors on every function call a user creates a custom subclass of OpsMessageHandler 532, MemoryCheckMessageHandler 535*a*. The user programs the MemoryCheckMessageHandler 535*a* to call a custom MemoryCheck( ) function 536 each time that message handler is invoked. Then the user creates a Factory object 510 called MemoryCheckMessageHandlerFactory 510 that creates instances of MemoryCheckMessageHandler 535*a*. Using the API in OpsMessageHandlerManager 530, the user registers that new action's factory under a custom Action tag name, e.g., "CHECK_MEMORY".

The user then creates a subscription configuration file (.ops) that uses the tag name CHECK_MEMORY with a set of existing filters to specify when to invoke the new custom behavior. For example, the .ops file with a customized action tag is specified as follows:

<?xml version="1.0" ?>
<OPS>
  <CHECK_MEMORY>
    <EVENT_TYPE_FILTER
      type="FUNC_ENTER"/>
  </CHECK_MEMORY>
</OPS>

Similarly, add-on interface allows custom creation of new filters. The user creates new custom Filter Objects custom filters are subclasses of OpsMessageFilter 522. Filter Factory objects 520 are registered through the API in OpsSubscriptionManager 400. When OpsSubscriptionManager 400 parses a subscription configuration file (e.g., .ops) and finds an unrecognized filter, it checks for new filter tags. If a new filter tag is registered, the corresponding FilterFactory 520 is called. The factory object 520 creates an instance of the OpsMessageFilter for the custom filter which is evaluated against the events in the main program. The custom filters and custom actions are therefore similarly created with the add-on interface.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claim.

What is claimed is:

1. A computer-implemented method for dynamically updating a software debugging policy associated with a software application, the method comprising:
   executing an application code with embedded debugging code that produces at least one corresponding debugging event;
   receiving configuration information that includes a debugging action associated with the corresponding debugging event;
   encountering the debugging event during the execution of the application code;
   determining the corresponding debugging action for the debugging event from the configuration information;
   performing the corresponding debugging action;
   receiving a modification to the configuration information during the execution of the application code, wherein the modification includes a new debugging action for the corresponding debugging event;
   applying the modification to the configuration information without halting the execution of the application code and without modifying the application code; and
   performing the new debugging action in response to the corresponding debugging event.

2. The method of claim 1, wherein the debugging event includes at least one of logging, verifying, asserting, checkpointing, or tracing.

3. The method of claim 1, wherein the debugging action includes at least one of outputting to a file, outputting to a platform's default debugging output, breaking an execution, providing an audible alert, or displaying an alert message display window.

4. An operations manager system in a software development platform for providing programming tools to handle debugging policy concerns in software applications, the operations manager system implemented in an apparatus which includes a processor and a memory, and the operations manager system comprising:

a reporting service programming tool for programming debugging events in the software applications, the reporting service programming tool including a reporting API comprising definitions for a set of programming elements that when programmed into a software application and executed in a computer system produce the debugging events;

a subscription service programming tool for specifying debugging policies associated with the debugging events based on subscriptions to the debugging events, the subscription service programming tool including a subscription configuration file definition that comprises a set of tags for defining subscriptions, the subscriptions configured to specify a debugging action when parsed by an executing software application that includes the programmed debugging events, wherein the subscription service programming tool enables debugging code embedded in the software application to perform debugging without requiring additional modification to the software application; and wherein the subscription service programming tool is further configured to modify the subscription configuration file during runtime.

5. The operations manager system of claim 4, wherein the debugging events include at least one of logging, verifying, asserting, check-pointing, or tracing.

6. The operations manager system of claim 4, wherein the debugging action includes at least one of outputting to a file, outputting to a platform's default debugging output, breaking an execution, providing an audible alert, or displaying an alert message display window.

7. The operations manager system of claim 4, wherein the programming elements defined by the reporting API of the reporting service programming tool include programming language specific classes and objects, the programming language including one of C++, C#, C, and JAVA.

8. The operations manager system of claim 7, wherein the reporting API includes a first set of programming elements associated with debugging mode execution and a second set of programming elements associated with normal execution, wherein the first set of programming elements are automatically omitted by a compiler when compiling a software application for normal execution.

9. The operations manager system of claim 4, wherein the subscription service programming tool includes a subscription API that defines the programming elements, at least one of the programming elements configured to cause the software application to monitor one or more subscription configuration files when executed by the processor.

10. The operations manager system of claim 9, wherein at least one of the programming elements is configured to parse the one or more subscription configuration files.

11. The operations manager system of claim 9, wherein at least one of the programming elements is configured to associate one or more subscriptions in the one or more subscription configuration files to one operational debugging action based on the tags in the one or more subscription configuration files.

12. The operations manager system of claim 4, wherein the set of tags in the configuration file definition includes operational configuration tags, subscription tags, and condition tags.

13. The operations manager system of claim 12, wherein the configuration file definition includes a plurality of attribute definitions configured to be combined with the plurality of tags to filter the debugging events programmed in the software application for indicating particular debugging events for output to one or more associated debugging actions.

14. A method for debugging an executable computer software program, the method comprising:

creating a subscription configuration file, the subscription configuration file indicating a debugging action associated with an debugging event which is produced by a debugging code, wherein the debugging code is embedded in the executable computer software program without specifying the debugging action, wherein the subscription configuration file enables the debugging code to perform diagnosis at a developer site or at a customer site without requiring additional modification to the executable computer software program;

transmitting the subscription configuration file over a computer network for placing in a computer system directory;

collecting data output according to the debugging action indicated in the subscription configuration file;

modifying the subscription configuration file;

transmitting the modified subscription configuration file over the computer network for placing in the computer system directory; and collecting data output according to the debugging action indicated in the modified subscription configuration file, wherein the change from the subscription configuration file to the modified subscription file takes place at runtime without modifying the executable computer software program.

15. The method of claim 14, wherein the subscription configuration file is created according to a configuration file definition that comprises a set of tags for defining subscriptions that when parsed by the executable computer software program triggers the associated debugging action.

16. The method of claim 14, wherein transmitting the subscription configuration file includes one of sending via electronic mail, enabling a user to download the subscription configuration file via the Internet, or placing the subscription configuration file in a computer storage device accessible to a user through the network.

17. The method of claim 14, wherein the executable computer software is configured to monitor the subscription configuration file to detect changes and further configured to, in response to detecting the changes, implement computer operations to trigger the debugging actions associated with each debugging event as indicated in the subscription configuration file.

18. A computer-implemented system having a processor for dynamically updating a software debugging policy associated with a software application, the system comprising:

means for executing an application code with embedded debugging code that produces at least one corresponding debugging event;

means for receiving configuration information that includes a debugging action associated with the corresponding debugging event;

means for encountering the debugging event during the execution of the application code;

means for determining the corresponding debugging action for the debugging event from the configuration information;

means for performing the corresponding debugging action;

means for receiving a modification to the configuration information during the execution of the application code, wherein the modification includes a new debugging action for the corresponding debugging event;

means for applying the modification to the configuration information without halting the execution of the application code and without modifying the application code; and means for performing the new debugging action in response to the corresponding debugging event.

19. A computer-implemented method for providing a dynamically updatable debugging policy associated with a software application, the method comprising:

providing an add-on interface in an operations manager system, the add-on interface for registering one or more custom action tags, each associated with one or more subscription actions, the subscription actions associated with computer programmed functions that when executed by a computer processor implement a custom debugging action with respect to the software application;

providing a subscription configuration file including at least one filter tag associated with one or more filters, the filters defining one or more conditions with respect to the software application, wherein the subscription configuration file indicates the debugging action associated with a debugging event which is produced by a debugging code, wherein the debugging code is embedded in the software application without specifying the debugging action, wherein the subscription configuration file can enable the debugging code to perform diagnosis at a developer site or at a customer site without requiring additional modification to the software application;

providing a parsing function in the operations manager system, the parsing function configured to parse the subscription configuration file, the parsing function further configured to invoke the execution of the computer programmed functions associated with at least one subscription action in response to parsing the one or more custom action tags associated with said subscription action and determining that the software application meets the one or more conditions specified in the associated one or more filters; and providing a replacement function for replacing the subscription configuration file with a modified subscription configuration file at runtime, wherein the replacement function causes a change in the debugging action associated with the debugging event without modifying the software application.

20. A computer-implemented method for providing a dynamically updatable debugging policy associated with a software application, the method comprising:

providing an add-on interface in an operations manager system, the add-on interface for registering custom filter tags associated with filters, the filters associated with conditions in the software application;

providing a subscription configuration file including action tags and at least one custom filter tag, at least one action tag associated with at least one of said custom filter tags, the action tags further associated with computer program functions that when executed by a computer processor produce debugging actions associated with the software application, wherein the subscription configuration file indicates a debugging action associated with an debugging event which is produced by a debugging code, wherein the debugging code is embedded in the software application without specifying the debugging action, wherein the subscription configuration file enables the debugging code to perform diagnosis at a developer site or at a customer site without requiring additional modification to the software application;

providing a parsing function in the operations manager system, the parsing function configured to parse the subscription configuration file, the parsing function further configured to invoke the execution of at least one of said computer program functions associated with the at least one action tag in response to parsing the at least one action tag associated with said at least one of the custom filter tags and determining that the software application meets the conditions specified in the at least one custom filter associated with said at least one of the custom filter tags; and providing a replacement function for replacing the subscription configuration file with a modified subscription configuration file at runtime, wherein the replacement function causes a change in the debugging action associated with the debugging event without modifying the software application.

* * * * *